G. H. GEHRKING.
HUSKING ROLLERS.
APPLICATION FILED FEB. 23, 1907.

911,390.

Patented Feb. 2, 1909.

WITNESSES

INVENTOR
George H. Gehrking
BY
ATTORNEYS

UNITED STATES PATENT OFFICE.

GEORGE HENRY GEHRKING, OF ELK MOUND, WISCONSIN.

HUSKING-ROLLER.

No. 911,390.        Specification of Letters Patent.        Patented Feb. 2, 1909.

Application filed February 23, 1907. Serial No. 358,903.

*To all whom it may concern:*

Be it known that I, GEORGE H. GEHRKING, a citizen of the United States, and a resident of Elk Mound, in the county of Dunn and State of Wisconsin, have invented a new and Improved Husking-Roller, of which the following is a full, clear, and exact description.

The invention relates to corn husking and fodder-shredding machines, and its object is to provide a new and improved pair of husking rollers, arranged to prevent crushing of the ear of corn, and to insure an easy gripping of the corn stalks, thus permitting of running the machine with a minimum expenditure of power.

The invention consists of novel features and parts and combinations of the same, which will be more fully described hereinafter and then pointed out in the claim.

A practical embodiment of the invention is represented in the accompanying drawings forming a part of this specification, in which similar characters of reference indicate corresponding parts in all the views.

Figure 1:
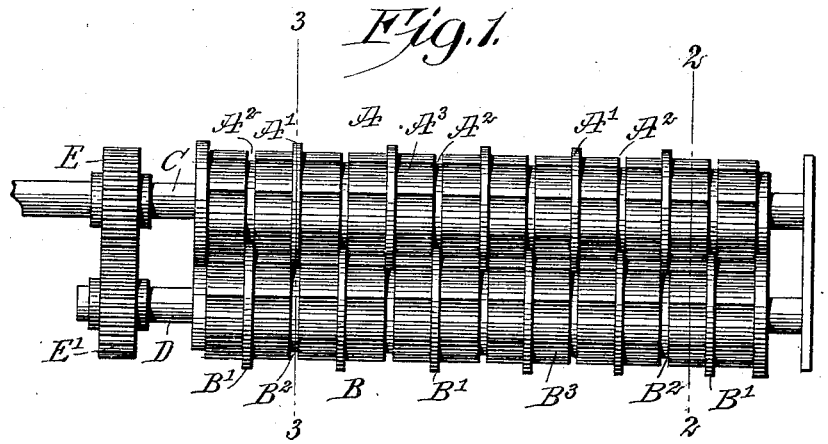
Figure 2:
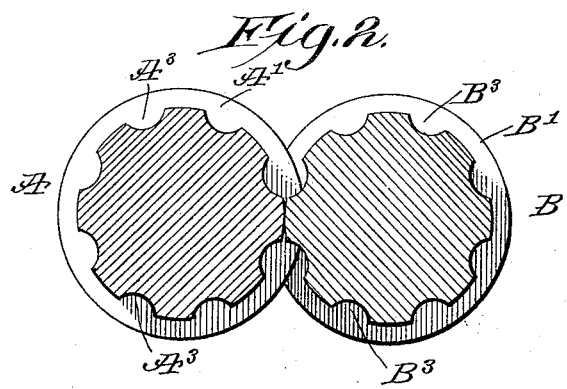
Figure 3:
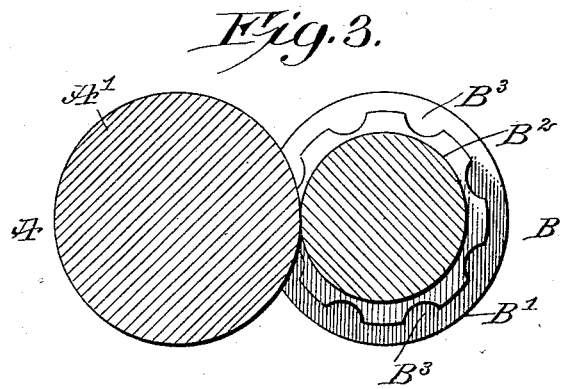

Figure 1 is a plan view of a pair of husking rollers; Fig. 2 is an enlarged transverse section of the same, on the line 2—2 of Fig. 1, and Fig. 3 is a similar view of the same on the line 3—3 of Fig. 1.

The co-acting husking rollers A and B of a corn husking and fodder-shredding machine, are provided on their shafts C and D with gear wheels E and E' in mesh with each other, so that when one of the shafts (as shown the shaft C) is driven, then the husking rollers A and B rotate in unison.

The peripheral faces of the husking rollers A and B are provided with alternating transversely extending annular flanges A', B' and with annular grooves $A^2$, $B^2$, the said flanges A' of the husking roller A engaging the grooves $B^2$ of the other husking roller B, and the flanges B' of the husking roller B engaging the grooves $A^2$ of the husking roller A, as plainly indicated in Fig. 1. The husking rollers A and B are also provided with spaced longitudinally extending recesses or grooves $A^3$, $B^3$, adapted to register at the point of contact of the husking rollers A and B.

When the corn husking and fodder-shredding machine is in use and the corn stalks pass between the rollers A and B, then the ear of corn of a stalk strikes one of the annular flanges A', for the latter to tear the ear off the stalk without danger of crushing or of bruising the ear of corn in any manner. By having the longitudinally extending grooves or recesses $A^3$, $B^3$ they easily accommodate the stalk, so that the stalk is not liable to be unduly wedged between the rotating rollers, and consequently it requires comparatively little power to turn the husking rollers.

The husking rollers shown and described are alike in construction, and can be cheaply manufactured and readily applied to corn husking and fodder-shredding machines as now constructed.

Having thus described my invention, I claim as new and desire to secure by Letters Patent:

A pair of coacting husking rollers, each having annular flanges and annular recesses spaced apart from each other and alternately arranged, the flanges of one roller running in the recesses of the other, and the periphery of the rollers between the flanges and recesses being provided with spaced longitudinal grooves for the purpose set forth.

In testimony whereof I have signed my name to this specification in the presence of two subscribing witnesses.

GEORGE HENRY GEHRKING.

Witnesses:
    A. B. AUSMAN,
    ARTHUR HOWE.